J. T. WILSON.
Dies for Making Car-Coupling Pins.

No. 152,539.  Patented June 30, 1874.

Witnesses.
D. R. Cowl
Edmund Masson

Inventor.
John T. Wilson,
By atty A. B. Stoughton.

UNITED STATES PATENT OFFICE.

JOHN T. WILSON, OF PITTSBURG, PENNSYLVANIA, ASSIGNOR OF ONE-HALF HIS RIGHT TO WILSON, LEGGATE & CO., OF SAME PLACE.

IMPROVEMENT IN DIES FOR MAKING CAR-COUPLING PINS.

Specification forming part of Letters Patent No. 152,539, dated June 30, 1874; application filed May 26, 1874.

*To all whom it may concern:*

Be it known that I, JOHN T. WILSON, of Pittsburg, in the county of Allegheny and State of Pennsylvania, have invented certain new and useful Improvements in the Manufacture of King or other Headed Bolts, or, as they are sometimes called, car-pins, for coupling cars; and I do hereby declare the following to be a full, clear, and exact description of the same, reference being had to the accompanying drawings, making part of the same, in which—

Figure 1:
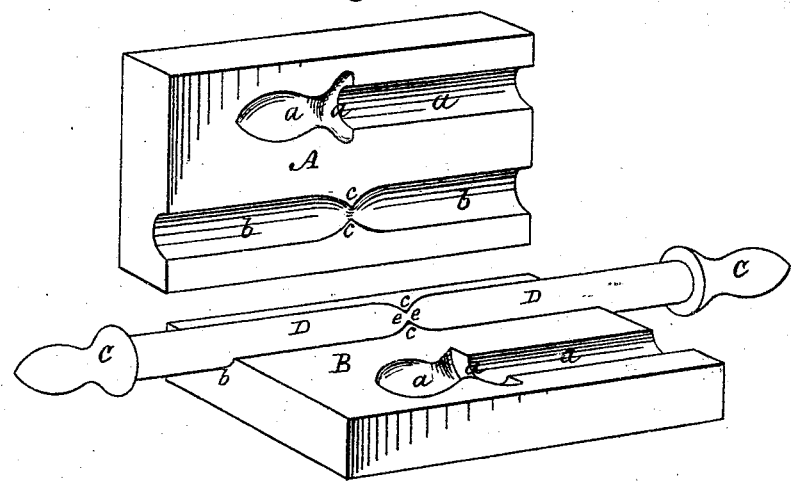
Figure 2:
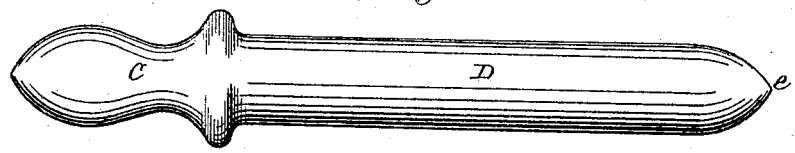

Figure 1 represents in perspective the dies in which the bolts are made and two bolts therein in the act of being worked into shape and form—that is, pointed and separated. Fig. 2 represents one of the finished bolts.

My invention consists in the combination of a pair of dies for making a head upon each end of a bar of the proper length, and pointing and separating the bar, so as to complete two bolts at one operation and heat, as will be explained.

The two plates A B, when laid together, form the dies in which the bolts are made. In each plate is formed, so as to match when laid together, the countersinks *a a*, of the shape and form of the head and collar or shoulder of the bolt when finished; and *b b* are the countersinks or counter-dies for forming the points of the bolts and separating, or practically so, the two bolts when finished.

The operation is as follows: A bar of iron of the proper length to make two bolts is first cut off, and the ends respectively thereof have worked or wrought upon them, in the dies *a a*, the heads *c c*, as seen at Fig. 1. This being done, the body of the bar D is placed in the dies *b b*, which are contracted at *c*, so as to form a line of separation, or practically so; and by turning the bar in the dies by the tongs or other holder the two points *e e* are simultaneously formed or shaped and the bar separated, or so nearly so as to be readily separated after being taken out, and thus the two bolts are finished at one operation, and by one and the same heat. The finished bolt is represented at Fig. 2, and is of perfect form and of very smooth exterior; and as there is but little upsetting or displacing of the fiber of the metal, they are very compact and strong. One of the advantages of thus making two bolts at one operation, as it were, is the facility with which the protruding ends of the bar may be seized and manipulated, thus expediting and cheapening the product, and the two bolts can be made at one and the same heat.

The diameter of the bar from which the pins or bolts are made should be about half an inch greater than that of the body of the pin or bolt when finished; or, in other words, to make pins of, say, from one inch and a quarter to one inch and three-eighths diameter, I use bars of one and three-quarter inches diameter.

What I claim, and desire to secure by Letters Patent, is—

In the manufacture of king-bolts, car-pins, or other headed bolts, the combination of the dies *a b* for shaping the heads and points of bolts or pins, substantially as herein described and represented.

JOHN T. WILSON.

Witnesses:
O. F. GRANT,
E. H. JANNEY.